US012741550B2

(12) United States Patent
Mahakali et al.

(10) Patent No.: US 12,741,550 B2
(45) Date of Patent: Sep. 22, 2026

(54) VEHICLE HAVING THERMAL BARRIER

(71) Applicant: FCA US LLC, Auburn Hills, MI (US)

(72) Inventors: Uday Mahakali, Novi, MI (US); Sreekanth Surapaneni, Oakland, MI (US); Venkata Chagarlamudi, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 497 days.

(21) Appl. No.: 18/475,761

(22) Filed: Sep. 27, 2023

(65) Prior Publication Data

US 2025/0100397 A1 Mar. 27, 2025

(51) Int. Cl.

*B60L 50/64* (2019.01)
*B60K 1/04* (2019.01)
*B60L 3/00* (2019.01)
*H01M 50/24* (2021.01)

(52) U.S. Cl.

CPC ................ *B60L 50/64* (2019.02); *B60K 1/04* (2013.01); *H01M 50/24* (2021.01); *B60K 2001/0438* (2013.01); *B60L 3/0046* (2013.01)

(58) Field of Classification Search

None

See application file for complete search history.

(56) References Cited

U.S. PATENT DOCUMENTS

2013/0153317 A1* 6/2013 Rawlinson .............. F41H 7/042 180/68.5
2022/0200079 A1* 6/2022 Boddakayala ...... H01M 50/375

FOREIGN PATENT DOCUMENTS

GB 2644090 A * 3/2026 ......... B05C 11/1036

* cited by examiner

*Primary Examiner* — Colin W. Slifka
(74) *Attorney, Agent, or Firm* — Jeremy J. Klobucar

(57) ABSTRACT

A vehicle that includes a controller and a battery pack including a casing having a plurality of battery cells stored therein. The casing includes a plurality of vents for discharging battery exhaust gases. A sensor is in communication with an interior of the casing and the controller, and the sensor is configured to generate either a signal indicative of a temperature of the interior of the casing or a signal indicative of a pressure within the interior of the casing. A plurality of thermal barriers are attached to the vehicle that are configured to deploy based on an instruction received from the controller that is based on the signal indicative of the temperature or the signal indicative of the pressure.

20 Claims, 4 Drawing Sheets

VEHICLE HAVING THERMAL BARRIER

FIELD

The present disclosure relates to a vehicle having a thermal barrier.

BACKGROUND

This section provides background information related to the present disclosure which is not necessarily prior art.

Vehicles with electric propulsion systems are becoming increasingly more common. Some electrically propelled vehicles include an electric drive motor at each wheel of the vehicle, and some electrically propelled vehicles include a front electric drive motor for rotating the front wheels of the vehicle and a rear electric drive motor for rotating the rear wheels of the vehicle. In either case, the electric drive motors receive power from a battery pack that includes a plurality of battery cells therein. Example battery cells include lithium-ion battery cells and lithium-metal battery cells.

Lithium-ion and lithium-metal battery cells sometimes undergo a process called thermal runaway during failure conditions. Thermal runaway may result in a rapid increase of battery cell temperature accompanied by the release of various gases, which may be very hot and, in some cases, may be flammable. These gases may spread or disperse outward from under the vehicle, which can make it difficult to exit the vehicle or for emergency personnel from approaching the vehicle.

SUMMARY

This section provides a general summary of the disclosure, and is not a comprehensive disclosure of its full scope or all of its features.

According to a first aspect of the present disclosure, there is provided a vehicle that includes a controller; a battery pack including a casing having a plurality of battery cells stored therein, the casing including a plurality of vents for discharging battery exhaust gases; a sensor in communication with an interior of the casing and the controller, the sensor configured to generate either a signal indicative of a temperature of the interior of the casing or a signal indicative of a pressure within the interior of the casing; and a plurality of thermal barriers attached to the vehicle that are configured to deploy based on an instruction received from the controller that is based on the signal indicative of the temperature or the signal indicative of the pressure.

According to the first aspect, the thermal barrier may be a thermally resistant sheet stored in a housing attached to the vehicle that, when deployed, extends between the housing and a ground beneath the vehicle.

According to the first aspect, a motor is attached to the housing that communicates with the controller and based on the instruction received from the controller, is configured to actuate the thermal barriers from a stored position where the thermally resistant sheet is stored in the housing to a deployed position where the thermally resistant sheet extends between the housing and the ground.

According to the first aspect, the thermally resistant sheet is formed of a woven fabric that is impermeable to the battery exhaust gases and fire-resistant.

According to the first aspect, a first thermal barrier of the plurality of thermal barriers extends along a length of a cabin of the vehicle along a first side of the vehicle, and a second thermal barrier of the plurality of thermal barriers extends along the length of the cabin of the vehicle along a second and opposite side of the vehicle.

According to the first aspect, a third thermal barrier of the plurality of thermal barriers extends along a width between a pair of front tires of the vehicle along a front side of the vehicle, and a fourth thermal barrier of the plurality of thermal barriers extends along a width between a pair of rear tires of the vehicle along a rear side of the vehicle.

According to the first aspect, the thermal barrier is an airbag stored in a housing attached to the vehicle that, when deployed, extends between the housing and a ground beneath the vehicle.

According to the first aspect, the plurality of thermal barriers, when deployed, are configured to contain the battery exhaust gases discharged from the plurality of vents at a location beneath the vehicle.

According to the first aspect, the sensor is a temperature sensor.

According to the first aspect, the sensor is a pressure sensor.

According to a second aspect of the present disclosure, there is provided a vehicle that includes a controller; a battery pack including a casing having a plurality of battery cells stored therein, the casing including a plurality of vents for discharging battery exhaust gases; a sensor in communication with an interior of the casing and the controller, the sensor configured to generate either a signal indicative of a temperature of the interior of the casing or a signal indicative of a pressure within the interior of the casing; and a plurality of housings attached to the vehicle that each include a thermal barrier stored therein and an actuator device for deploying the thermal barrier from a stored position to a deployed position, the actuator devices being configured to deploy the thermal barriers based on an instruction received from the controller in response to either the signal indicative of the temperature or the signal indicative of the pressure.

According to the second aspect, the thermal barriers are each a thermally resistant sheet that, when deployed, extends between the housing and a ground beneath the vehicle.

According to the second aspect, the actuator device is a motor is attached to the housing that communicates with the controller and based on the instruction received from the controller, is configured to actuate the thermal barriers from the stored position to the deployed position where the thermally resistant sheet extends between the housing and the ground.

According to the second aspect, the thermally resistant sheet is formed of a woven fabric that is impermeable to the battery exhaust gases and fire-resistant.

According to the second aspect, a first thermal barrier of the plurality of thermal barriers extends along a length of a cabin of the vehicle along a first side of the vehicle, and a second thermal barrier of the plurality of thermal barriers extends along the length of the cabin of the vehicle along a second and opposite side of the vehicle.

According to the second aspect, a third thermal barrier of the plurality of thermal barriers extends along a width between a pair of front tires of the vehicle along a front side of the vehicle, and a fourth thermal barrier of the plurality of thermal barriers extends along a width between a pair of rear tires of the vehicle along a rear side of the vehicle.

According to the second aspect, the thermal barrier is an airbag stored in a housing attached to the vehicle that, when deployed, extends between the housing and a ground beneath the vehicle, and the actuator device is an igniter.

According to the second aspect, the plurality of thermal barriers, when deployed, are configured to contain the battery exhaust gases discharged from the plurality of vents at a location beneath the vehicle.

According to the second aspect, the sensor is a temperature sensor.

According to the second aspect, the sensor is a pressure sensor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
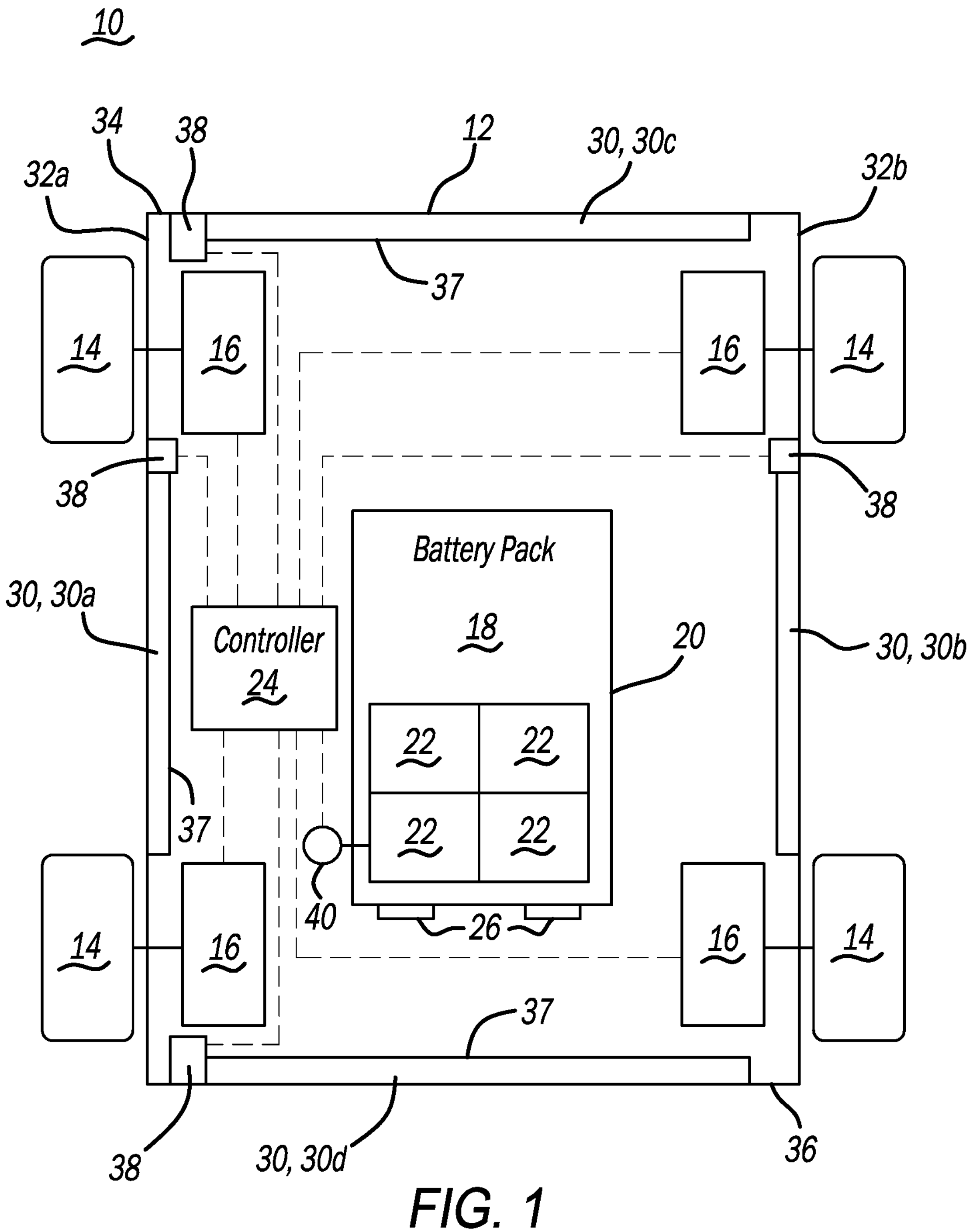
FIG. 1 is a schematic representation of a vehicle having a plurality of thermal barriers.

FIG. 1 schematically illustrates an electric vehicle 10 according to the present disclosure. Vehicle 10 includes a body 12, a plurality of wheels 14. In the illustrated embodiment, each wheel 14 is driven using a respective electric drive module 16 that receives electric power from a battery pack 18 having a casing 20 that encases a plurality of battery cells 22. Example battery cells 22 include lithium-ion battery cells, lithium-metal battery cells, and combinations thereof. It should be understood, however, that other types of battery cells 22 known to one skilled in the art may be used, without limitation. Casing 20 is preferably formed of a rigid metal material (e.g., steel, aluminum, and the like) that is resistant to puncture and is non-flammable.

While FIG. 1 illustrates four electric drive modules 16 such that each wheel 14 can be driven by a single electric drive module 16, it should be understood that vehicle 10 may include a single electric drive module 16 for driving a pair of wheels 14 (e.g., for driving the pair of front wheels 14 or the pair of rear wheels 14), or may include a pair of electric drive modules 16 with one of the electric drive modules 16 driving the front pair of wheels 14 and another of the electric drive modules 16 driving the rear pair of wheels 14. Regardless of the configuration selected, it should be understood that electric drive modules 16 receive a voltage or current from battery pack 18 that is utilized by the electric drive module 16 to drive the wheels 14 of the vehicle 10.

Vehicle 10 also includes a controller 24 in communication with each of the drive modules 16 and in communication with the battery pack 18. Controller 24 may be used to control electric drive modules 16 to control a speed of vehicle 10 and may also be used to monitor and/or communicate with various systems of vehicle such as an HVAC system (not shown), a vehicle braking system (not shown), and any other system that may be part of vehicle 10.

As noted above, battery cells 22 may sometimes undergo a process called thermal runaway during failure conditions of the battery cell(s) 22. Thermal runaway may result in a rapid increase of battery cell temperature accompanied by the release of various gases, which in some cases may be flammable. Example gases that may be released during a thermal runaway event include hydrogen ($H_2$), carbon monoxide (CO), carbon dioxide ($CO_2$), and various hydrocarbons including, but not limited to, methane, ethane, ethylene, acetylene, propane, cyclopropane, and butane. As these gases are released and the temperature of battery pack 18 increases, the pressure within battery pack 18 also increases.

Figure 2:
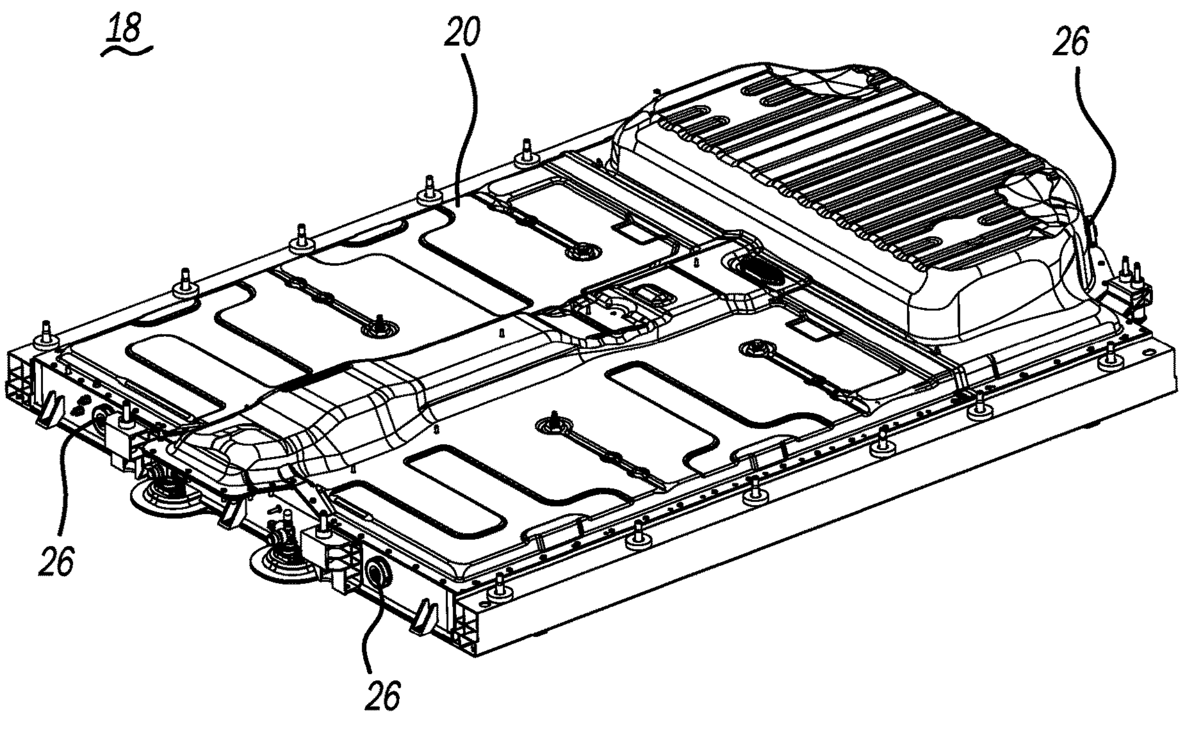
FIG. 2 is a perspective view of a battery pack that is part of the vehicle illustrated in FIG. 1.
Figure 3:
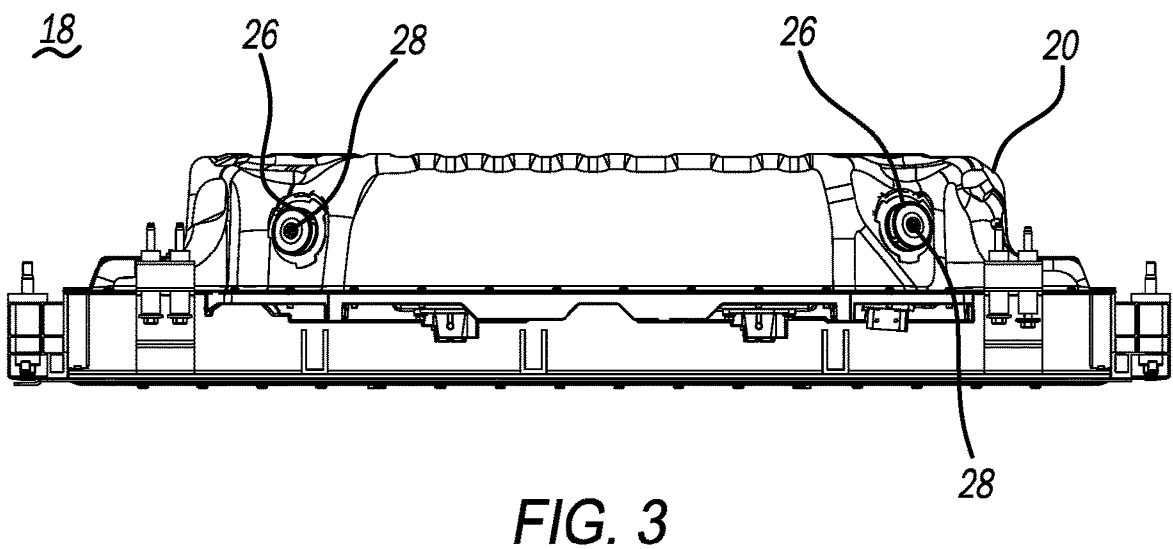
FIG. 3 is a side perspective view of the battery pack illustrated in FIG. 2.

Now referring to FIGS. 2 and 3 with continued reference to FIG. 1, it can be seen that casing 20 of battery pack 18 includes a plurality of discharge vents 26 that permit the pressure and gases to escape casing 20 during a thermal runaway event. Discharge vents 26 may each include a valve 28 (FIG. 3) that may be a one-way valve and opens upon a predetermined pressure threshold being generated within housing 16. For example, if the pressure within casing 20 reaches 100 millibars the valves 28 may open and permit the gases within casing 20 to exit the battery pack 18. Discharge vents 26 may be in communication with various conduits (not shown) located in battery pack 18, which direct the gases generated during the thermal runaway event to the discharge vents 26 to be expelled from battery pack 20.

While casing 20 may include discharge vents 26 including valves 28 for releasing the gases from battery pack 12, the gases released from battery pack 18 may collect beneath the vehicle 10. While only two pairs of discharge vents 26 including valves 28 are illustrated in FIGS. 2 and 3, it should be understood that battery pack 18 may include a greater number of discharge vents 26 having valves 28 without departing from the scope of the present disclosure. If the gases are at a sufficient temperature, the gases may combust after exiting battery pack 18 at a location beneath vehicle 10. If this occurs, there is the potential for other features of the vehicle 10 to also combust including, for example, the tires (not shown) of the wheels 14, hoses (not shown), vehicle brakes (not shown) and other features. Even if gases do not combust after exiting battery pack 18, the gases emitted from vents 26 can be very hot and may disperse outward relative to body 12 of vehicle 10. If this occurs, the gases may damage objects located proximate to vehicle 10.

Figure 4:
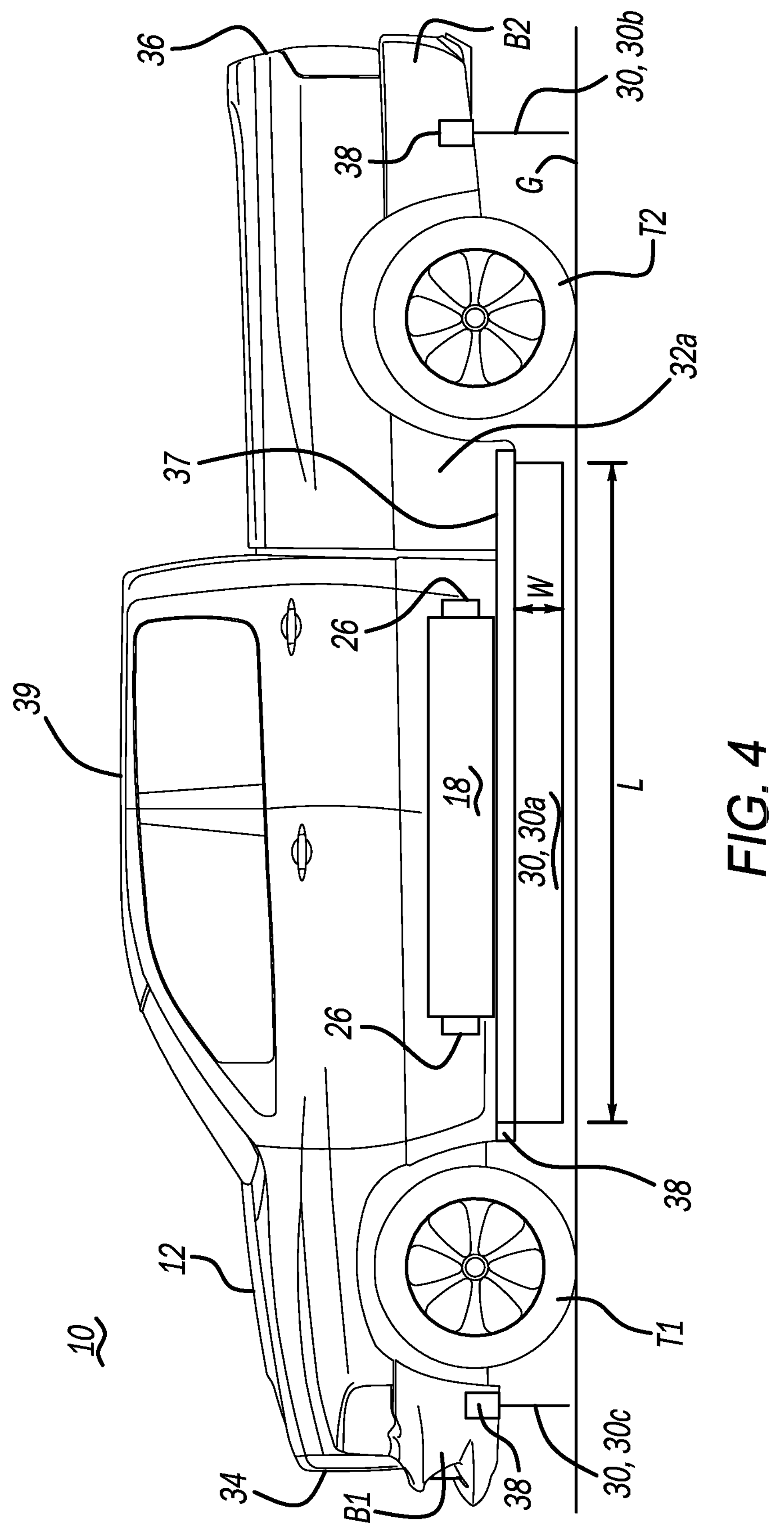
FIG. 4 is a side-perspective view of a vehicle with the thermal barriers in the form of a sheet being in a deployed position.

To prevent or at least substantially minimize the dispersion of gases emitted from vents 26 outward from body 12 of vehicle 10, vehicle 10 may include a plurality of thermal barriers 30. Thermal barriers 30 may include at least a pair of thermal barriers 30*a* and 30*b* provided along sides 32*a* and 32*b* of vehicle 10. By providing thermal barriers 30*a* and 30*b* along sides 32*a* and 32*b* of vehicle 10, the gases emitted by vents 26 will be directed either toward a front 34 or rear 36 of vehicle so that there is minimal pressure buildup under vehicle 10 during the thermal runaway event. It should be understood, however, that the plurality of thermal barriers 30 may include a front thermal barrier 32*c* provided at the front 34 of vehicle 10 and a rear thermal barrier 30*d* provided at the rear 36 of vehicle 10, if desired and as may be needed in certain vehicles. If vehicle 10 includes thermal barriers 32*c* and 32*d*, however, it should be understood that thermal barriers 32*c* and 32*d* should be designed in such a way that barriers 32*c* and 32*d* at least provide a passage for the controlled escape of gases there-through or around. Each thermal barrier 30 may be in the form of a thermally resistant (e.g., first retardant) sheet (FIG. 4) that is configured to be deployed during a thermal runaway event. Example thermally resistant sheets include fire-retardant textile materials such as those used to form an airbag (e.g., woven fabrics impermeable to gases and fire resistant)

More specifically, each thermal barrier 30 when not in use may attached to a rod (not shown), rolled about the rod (not shown), and stored in a housing 37 provided along the sides 32*a*, 32*b*, front 34, and rear 36 of vehicle. To deploy the thermal barriers 30, the rod (not shown) may be attached to an actuator device 38 that, in the illustrated embodiment is a motor that is provided with electric power from battery pack 18 or by a separate battery (not shown) that is part of the actuator device 38 . . . . Each actuator device 38 may be in communication with controller 24 such during a thermal runaway event, controller 24 can instruct motors 38 to rotate rod (not shown) and deploy the thermal barriers 30 such that, when thermal barriers 30 are deployed, the thermal barriers 30 will extend from the housings 36 in a direction toward the ground G beneath vehicle 10. In this manner, thermal barriers 30 are configured to contain the battery gases emitted from vents 26 beneath vehicle 10 and prevent the battery gases from dispersing outward from body 12 of vehicle 10.

The dimensions of thermal barriers 30 are variable and can be determined by the vehicle 10 that thermal barriers 30 are installed. For example, a length L of thermal barriers 30*a*, 30*b* can be determined by a length of a cabin 39 of vehicle 10. A width W of barriers 30*a*, 36*b* can be determined by an amount of ground clearance between the cabin 39 and the ground G. Similarly, a length of the thermal barriers 30*c*, 30*d* can be determined by a width of the vehicle 10 between, for example, the front tires T1 and the rear tires T2, respectively. A width of the thermal barriers 30*c*, 30*d* can be determined by, for example, the ground clearance between the front bumper and rear bumpers B1 and B2, respectively, and the ground G.

As illustrated in FIG. 1, a sensor 40 is in communication with battery pack 18 and controller 24. Sensor 40 may be capable of generating a signal indicative of temperature or sensor 40 or sensor 40 may be capable of generating a signal indicative of pressure. If capable of generating a signal indicative of temperature, sensor 40 communicates temperature data of battery pack 18 to controller 24 and in the event that the signals indicative of temperature indicate that a thermal runaway event may be occurring (e.g., temperatures in excess of 100 degrees C.), controller 24 can instruct motors 38 to deploy thermal barriers 30.

When a thermal runaway event occurs, the gases generated by batteries 22 will increase the pressure within casing 20 of battery pack 18. Thus, if sensor 40 generates signals indicative of pressure that are indicative of a thermal runaway event occurring (e.g., pressures in excess of 100 millibars), controller 24 can instruct motors 38 to deploy thermal barriers 30.

Housings 37 that include thermal barriers 30 in the non-deployed state may be attached to a frame (not shown) of vehicle 10. For example, housings 37 that include thermal barriers 30*a* and 30*b* along sides of vehicle 10 may be attached to the pair of longitudinal rails (not shown) that extend along a length of vehicle 10 with battery pack 18 therebetween. Similarly, the vehicle frame may include cross-members (not shown) at the front 34 and rear 36 of vehicle that extend between the longitudinally extending rails (not shown) that can support housings 37 of the thermal barriers 30*c* and 30*d*. Other features that can support housings 37 include rocker panels (not shown) extending along a length of cabin 39 and the vehicle bumpers B1 and B2.

Figure 5:
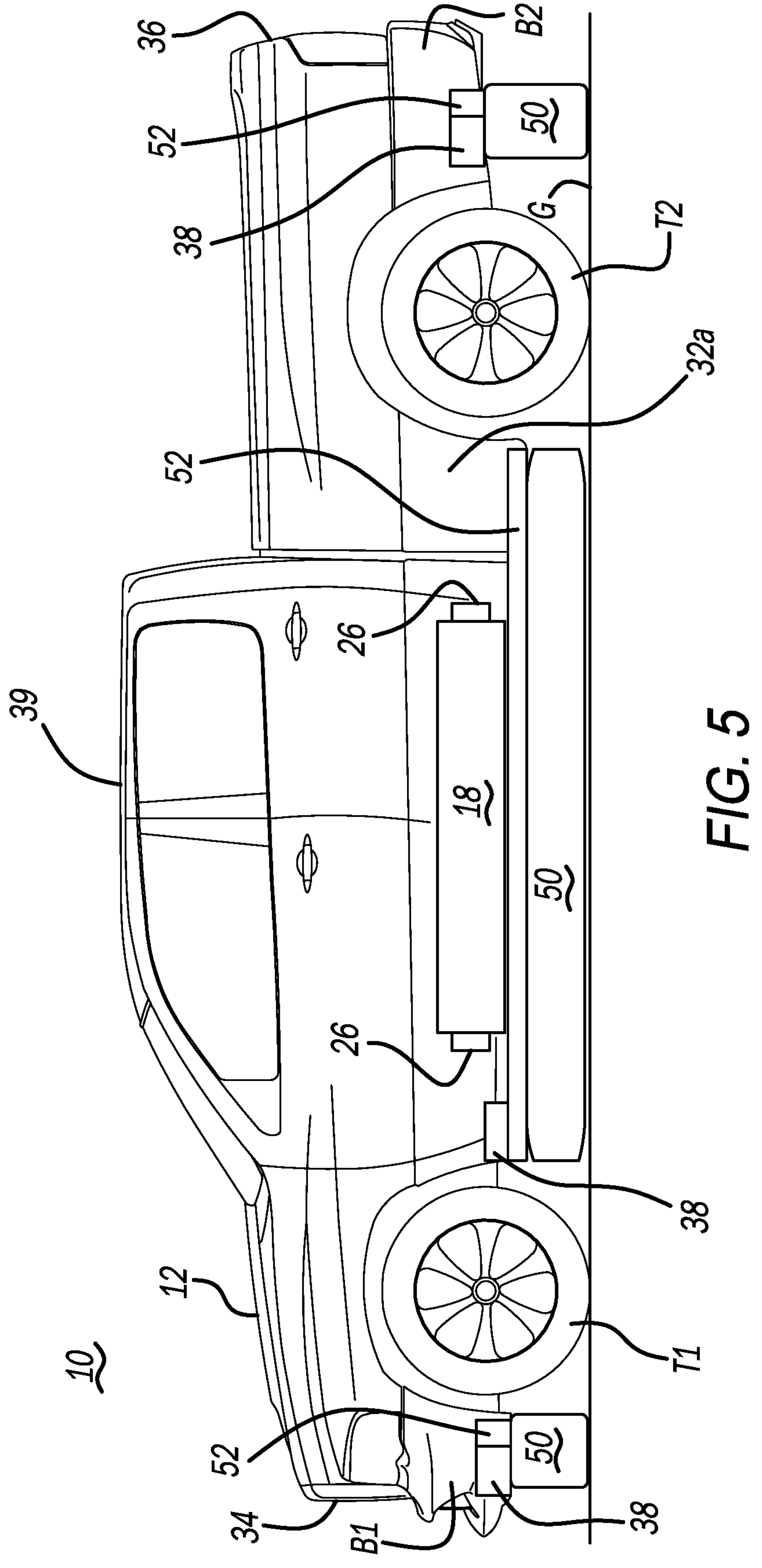
FIG. 5 is a side-perspective view of a vehicle with the thermal barriers in the form of an airbag being in a deployed position.

While the above description relative to thermal barriers 30 has been directed to the thermal barriers 30 being in the form of a sheet material, it should be understood that the thermal barriers 30 may also be in the form of an airbag that is inflated in response to an instruction from controller 24. Referring to FIG. 5, airbags 50 are illustrated in the deployed state. Airbags 50 may be stored in airbag housings 52 that may be attached to vehicle 10 at locations similar to housings 37 that store thermal barriers 30. The actuator device 38 for thermal barriers 30 when in the form of an airbag 50 is an igniter. Similar to operation of motors 38, the igniter provided with an electric current that triggers igniter based on a communication received from controller 24 and only deployed in the event of thermal runaway. That is, based on signals indicative of either temperature or pressure that may indicate a thermal runaway event occurring received from sensor 40, controller 24 can activate airbags 50 to deploy and contain the hot battery exhaust gases beneath vehicle 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:

a controller;

a battery pack including a casing having a plurality of battery cells stored therein, the casing including a plurality of vents for discharging battery exhaust gases;

a sensor in communication with an interior of the casing and the controller, the sensor configured to generate either a signal indicative of a temperature of the interior of the casing or a signal indicative of a pressure within the interior of the casing; and a plurality of thermal barriers attached to the vehicle that are configured to deploy based on an instruction received from the controller that is based on the signal indicative of the temperature or the signal indicative of the pressure.

2. The vehicle according to claim 1, wherein the thermal barrier is a thermally resistant sheet stored in a housing attached to the vehicle that, when deployed, extends between the housing and a ground beneath the vehicle.

3. The vehicle according to claim 2, wherein a motor is attached to the housing that communicates with the controller and based on the instruction received from the controller, is configured to actuate the thermal barriers from a stored position where the thermally resistant sheet is stored in the housing to a deployed position where the thermally resistant sheet extends between the housing and the ground.

4. The vehicle according to claim 1, wherein the thermally resistant sheet is formed of a woven fabric that is impermeable to the battery exhaust gases and fire-resistant.

5. The vehicle according to claim 1, wherein a first thermal barrier of the plurality of thermal barriers extends along a length of a cabin of the vehicle along a first side of the vehicle, and a second thermal barrier of the plurality of thermal barriers extends along the length of the cabin of the vehicle along a second and opposite side of the vehicle.

6. The vehicle according to claim 5, wherein a third thermal barrier of the plurality of thermal barriers extends along a width between a pair of front tires of the vehicle along a front side of the vehicle, and a fourth thermal barrier of the plurality of thermal barriers extends along a width between a pair of rear tires of the vehicle along a rear side of the vehicle.

7. The vehicle according to claim 1, wherein the thermal barrier is an airbag stored in a housing attached to the vehicle that, when deployed, extends between the housing and a ground beneath the vehicle.

8. The vehicle according to claim 1, wherein the plurality of thermal barriers, when deployed, are configured to contain the battery exhaust gases discharged from the plurality of vents at a location beneath the vehicle.

9. The vehicle according to claim 1, wherein the sensor is a temperature sensor.

10. The vehicle according to claim 1, wherein the sensor is a pressure sensor.

11. A vehicle comprising:

a controller;

a battery pack including a casing having a plurality of battery cells stored therein, the casing including a plurality of vents for discharging battery exhaust gases;

a sensor in communication with an interior of the casing and the controller, the sensor configured to generate either a signal indicative of a temperature of the interior of the casing or a signal indicative of a pressure within the interior of the casing; and a plurality of housings attached to the vehicle that each include a thermal barrier stored therein and an actuator device for deploying the thermal barrier from a stored position to a deployed position, the actuator devices being configured to deploy the thermal barriers based on an instruction received from the controller in response to either the signal indicative of the temperature or the signal indicative of the pressure.

12. The vehicle according to claim 11, wherein the thermal barriers are each a thermally resistant sheet that, when deployed, extends between the housing and a ground beneath the vehicle.

13. The vehicle according to claim 12, wherein the actuator device is a motor is attached to the housing that communicates with the controller and based on the instruction received from the controller, is configured to actuate the thermal barriers from the stored position to the deployed position where the thermally resistant sheet extends between the housing and the ground.

14. The vehicle according to claim 11, wherein the thermally resistant sheet is formed of a woven fabric that is impermeable to the battery exhaust gases and fire-resistant.

15. The vehicle according to claim 11, wherein a first thermal barrier of the plurality of thermal barriers extends along a length of a cabin of the vehicle along a first side of the vehicle, and a second thermal barrier of the plurality of thermal barriers extends along the length of the cabin of the vehicle along a second and opposite side of the vehicle.

16. The vehicle according to claim 15, wherein a third thermal barrier of the plurality of thermal barriers extends along a width between a pair of front tires of the vehicle along a front side of the vehicle, and a fourth thermal barrier of the plurality of thermal barriers extends along a width between a pair of rear tires of the vehicle along a rear side of the vehicle.

17. The vehicle according to claim 11, wherein the thermal barrier is an airbag stored in a housing attached to the vehicle that, when deployed, extends between the housing and a ground beneath the vehicle, and the actuator device is an igniter.

18. The vehicle according to claim 11, wherein the plurality of thermal barriers, when deployed, are configured to contain the battery exhaust gases discharged from the plurality of vents at a location beneath the vehicle.

19. The vehicle according to claim 11, wherein the sensor is a temperature sensor.

20. The vehicle according to claim 11, wherein the sensor is a pressure sensor.

* * * * *